(12) United States Patent
Fluckiger et al.

(10) Patent No.: US 10,122,194 B2
(45) Date of Patent: Nov. 6, 2018

(54) INPUT DEVICE STAND AND ENERGY STORAGE DEVICE

(71) Applicant: Logitech Europe S.A., Lausanne (CH)

(72) Inventors: Jean-Marc Fluckiger, Causeway Bay (TW); Chun-Wei Su, Taipei (TW); Yibo Shao, Tsuen Wan (HK)

(73) Assignee: Logitech Europe S.A., Lausanne (CH)

( * ) Notice: Subject to any disclaimer, the term of this patent is extended or adjusted under 35 U.S.C. 154(b) by 105 days.

(21) Appl. No.: 15/248,903

(22) Filed: Aug. 26, 2016

(65) Prior Publication Data

US 2017/0077728 A1     Mar. 16, 2017

Related U.S. Application Data

(60) Provisional application No. 62/217,754, filed on Sep. 11, 2015.

(51) Int. Cl.
| | |
|---|---|
| *H01M 10/46* | (2006.01) |
| *H02J 7/00* | (2006.01) |
| *G06F 1/26* | (2006.01) |

(52) U.S. Cl.
CPC ............. *H02J 7/0044* (2013.01); *G06F 1/26* (2013.01); *H02J 7/0052* (2013.01); *H02J 2007/0062* (2013.01)

(58) Field of Classification Search
CPC .. H02J 7/025; H02J 5/005; H02J 7/355; H02J 7/0042; H02J 2007/0062

USPC ........ 320/107, 108, 111, 114, 115; D13/107, D13/108
See application file for complete search history.

(56) References Cited

U.S. PATENT DOCUMENTS

| | | | | |
|---|---|---|---|---|
| D649,551 | S * | 11/2011 | Hwang | D13/107 |
| D701,213 | S * | 3/2014 | Pajic | D14/447 |
| 9,819,202 | B2 * | 11/2017 | Caren | H02J 7/0027 |
| 2007/0002533 | A1 * | 1/2007 | Kogan | B60R 11/0241 |
| | | | | 361/679.41 |
| 2013/0058036 | A1 * | 3/2013 | Holzer | G06F 1/1632 |
| | | | | 361/679.44 |
| 2013/0207478 | A1 * | 8/2013 | Metcalf | A47C 7/70 |
| | | | | 307/104 |
| 2016/0320801 | A1 * | 11/2016 | Buss | G06F 1/1632 |

* cited by examiner

*Primary Examiner* — Edward Tso
(74) *Attorney, Agent, or Firm* — Kilpatrick Townsend & Stockton LLP

(57) ABSTRACT

Embodiments of the invention relate to an apparatus comprising a housing having a substantially rectangular shape and including a top side, a bottom side, and a slot that passes from the top side to the bottom side of the housing to secure a mobile input device in an upright configuration. The apparatus further includes an energy storage device disposed within the housing to charge the mobile input device. The energy storage device may charge the mobile input device by inductive charging or hardwire (e.g., via a retractable cable). The slot can include a coating or covering to increase a coefficient between the slot and the mobile input device. The slot can be disposed in the long end of the housing and can support the mobile input device in either a portrait or landscape upright configuration, from either the top end or the bottom end.

15 Claims, 8 Drawing Sheets

INPUT DEVICE STAND AND ENERGY STORAGE DEVICE

CROSS-REFERENCES TO RELATED APPLICATIONS

This application is a non-provisional application and claims the benefit and priority of U.S. Provisional Application No. 62/217,754, filed on Sep. 11, 2015, and titled "Energy Storage Device," which is hereby incorporated by reference in its entirety for all purposes.

BACKGROUND

Mobile input devices have become more and more commonplace in commercial and recreational use and are a mainstay in modern society. As most mobile input devices operate on batteries, there have been a number of charging devices (e.g., energy storage devices) that help users on the go who do not have time to plug into a wall outlet or convenient access to one. For instance, additional battery packs have been coupled to protective devices that house mobile input devices to increase operating times between charges. However, many designs of charging devices tend to be bulky, cumbersome, and inconvenient at best. Improved designs and implementations are needed.

BRIEF SUMMARY

Aspects of the invention relate to a mobile input device charging apparatus that includes a housing having a substantially rectangular shape with a top side, a bottom side, and a slot that passes through from the top side to the bottom side of the housing that is operable to receive and secure a mobile input device in an upright configuration. An energy storage device can be disposed within the housing to electrically couple to and charge the mobile input device. Some embodiments can include an inductive device to inductively transfer energy from the energy storage device to the mobile input device. Alternatively or additionally, some embodiments can include a cable (e.g., a retractable cable) to couple to and transfer energy from the energy storage device to the mobile input device.

The slot can include inner walls having a surface area that has a covering to increase a coefficient of friction between the mobile input device and the surface area of the slot when the mobile input device is secured in the slot in an upright position. The covering may be comprised of rubber, polyurethane (PU), or other suitable compound having similar material properties.

In some cases, the rectangular-shaped housing can include long edges and short edges and the slot may extend along one of the long edges of the housing. The slot may support the mobile input device in an upright portrait or landscape orientation and in both a forward facing or rear facing upright configuration. In some implementations, the slot can be operable to receive the mobile input device from both the top side or from the bottom side. In some cases, at least a portion of the slot can include a grip-like opening to conform to a human hand. In certain embodiments, the charging apparatus can include an integrated input or output device disposed in the housing including at least one of a keyboard, a trackpad, a speaker, a joystick, a display, a touchpad, a game pad, or a microphone. The mobile input device can be a smart phone, tablet computer, or other suitably shaped computing device that can be placed in the slot.

In certain embodiments, a portable charging device includes a rectangular housing, a slot disposed in and passing through the housing, the slot operable to support a mobile input device in an upright configuration, and an energy storage device disposed in the housing to couple to and charge the mobile input device. The slot can be overmolded with a rubber or PU coating to increase a coefficient of friction between the slot and the mobile input device when the mobile input device is placed in the slot. The housing can include a top side and a bottom side, where the slot may be operable to receive the mobile input device from both the top side or the bottom side of the housing. The slot can include a widened region forming a grip-like opening to conform to a human hand. The slot may support the mobile input device in both a forward-facing or rear-facing upright configuration.

The portable charging device can include an integrated input or output device disposed in the housing, including at least one of a keyboard, a trackpad, a speaker, a joystick, a display, touchpad, a game pad, or a microphone. In some implementations, the input or output device can be activated when the mobile input device is configured in the slot, and deactivated when the mobile input device is not configured in the slot. The mobile input device can be a tablet computer, smart phone, or other suitably shaped mobile input device.

DETAILED DESCRIPTION

The invention relates generally to improvements in energy storage devices for mobile input devices including tablet computers, mobile phones, and other computing devices.

Embodiments of the invention relate to a mobile input device charging apparatus that can be used to charge a mobile input device such as a tablet computer, phablet, mobile phone, personal digital assistant (PDA), digital garment (e.g., watch, glasses, bracelet, anklet, etc.) or other suitable computing device. In some embodiments, a charging apparatus comprises a housing having a substantially rectangular shape and including a top side, a bottom side, and a slot that passes from the top side to the bottom side of the housing to secure a mobile input device in an upright position. The charging apparatus further includes an energy storage device disposed within the housing and configured to charge the mobile input device. The energy storage device may charge the mobile input device by inductive charging or hardwire (e.g., via a retractable cable). The slot can include a coating or covering to increase a coefficient of friction between the slot and the mobile input device. The slot can be configured on the long end of the housing and can support the mobile input device in either a portrait or landscape upright configuration, from either the top end or the bottom end. The housing and slot may take many forms, shapes, and sizes. Some housings may be rectangular, round, square, triangular, trapezoidal, or other polygon. The slot can be a uniform shape (rectangular trench) or non-uniform shape (e.g., with a curvature). Some examples of the myriad possibilities are discussed below. A charging apparatus can be referred to as a portable charging device, charging system, battery block, or the like.

Figure 1:
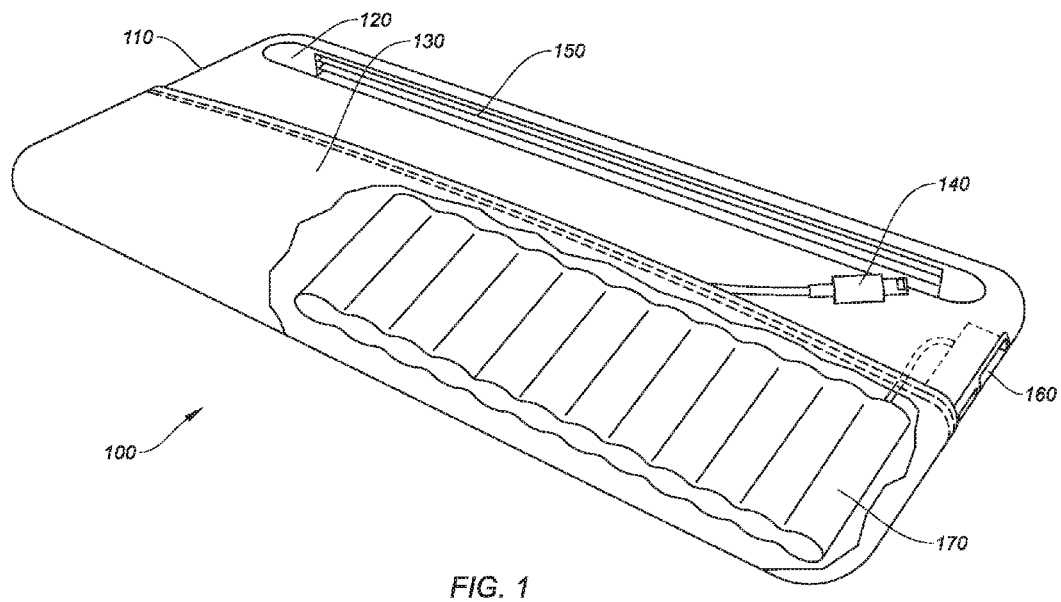
FIG. 1 shows a charging apparatus, according to certain embodiments.

FIG. 1 shows charging apparatus 100, according to certain embodiments. Charging apparatus 100 includes housing 110, slot 120, pouch 130, charging cable 140, frictional features 150, input/output jacks 160, and an energy storage device (e.g., battery pack—not shown). Housing 110 is shown in a rounded rectangular shape, although other shapes are possible (e.g., rounded, trapezoidal, square, etc.). Charging apparatus 100 can both hold an input device (e.g., mobile phone) in an upright viewing angle and charge the device at the same time to provide a more functional and useful charging solution.

Slot 120 can support an input device (e.g., mobile phone, tablet computer) in an upright position as the input device is charging. Slot 120 can be a through-hole slot passing from the top side of housing 110 through to the bottom side of housing 110, as more clearly shown in FIG. 7A. Slot 120 is shown along a long end of rectangular housing 110, but may be disposed in any suitable location on housing 110 having any suitable dimensions. For instance, slot 120 may be straight, curved, or may include angles. Slot 120 can be of any length or width, and can include shaped in any fashion (e.g., see FIG. 7B). In some embodiments, slot 120 may have a certain width on the top side of housing 110, and a different width on the bottom side of housing 110 (e.g., slot 120 may transitionally narrow from the top side to the bottom side). Slot 120 can support a mobile input device in either a portrait or landscape orientation. Since slot 120 passes all the way through housing 110, charging apparatus 100 can be flipped onto its opposite side and function similarly depending on the dimensions of the slot on the opposing sides.

Figure 5:
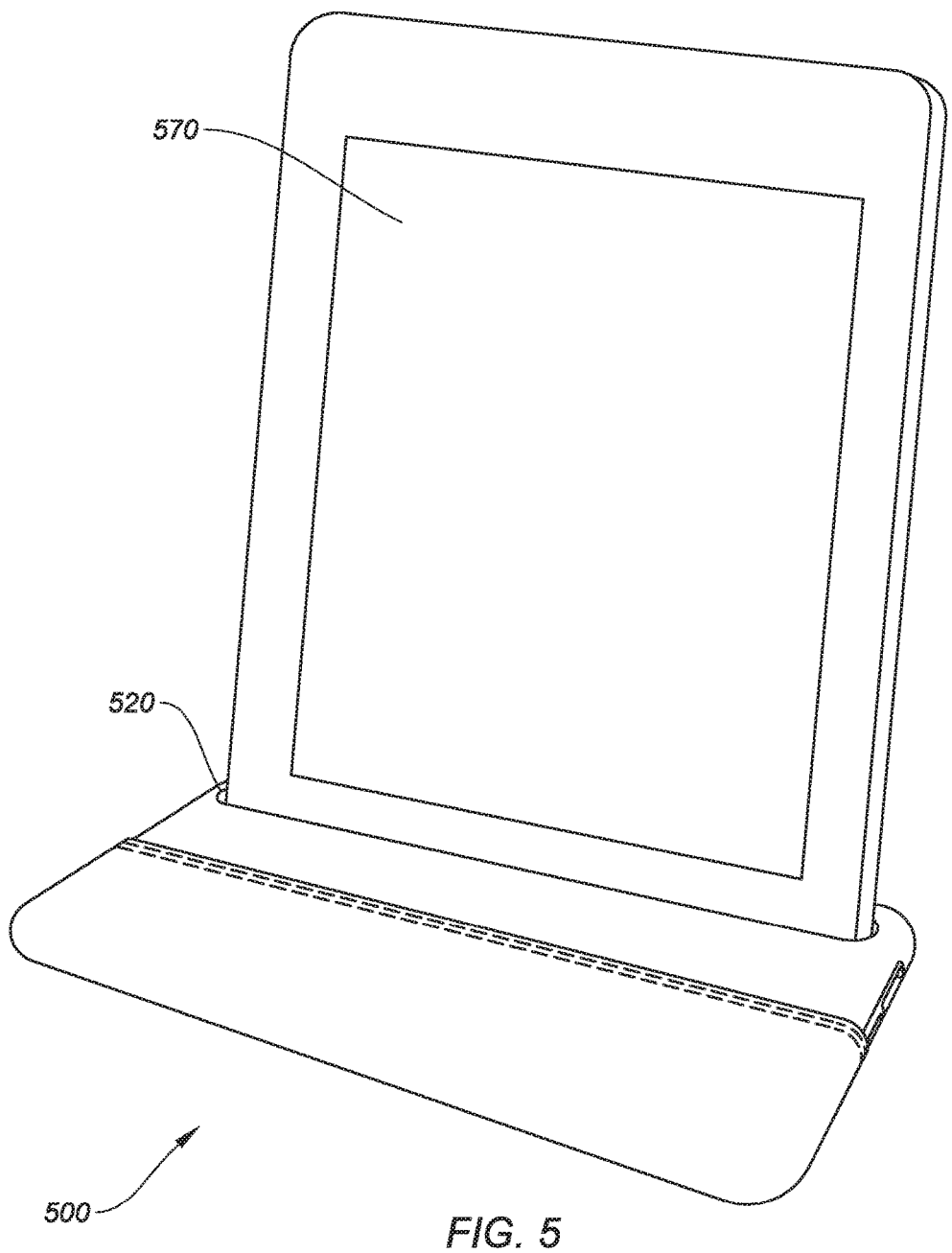
FIG. 5 shows a mobile input device (i.e., a tablet computer) configured in a slot of a charging apparatus, according to certain embodiments.
Figure 6:
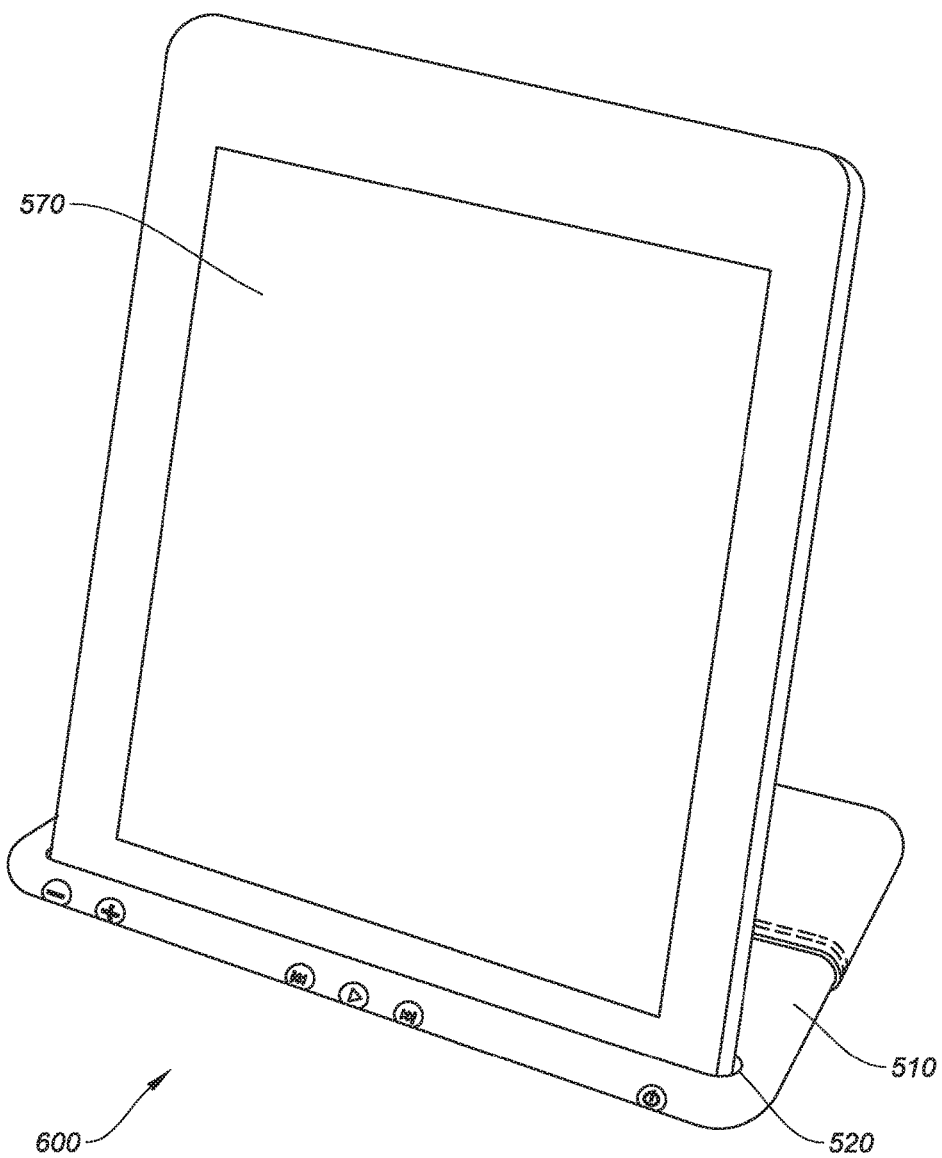
FIG. 6 shows a mobile input device (i.e., a tablet computer) configured in a slot of a charging apparatus, according to certain embodiments.

In some embodiments, slot 120 can support a mobile input device in either a forward facing or rear facing orientation (see e.g., FIGS. 5-6). The angle that the input device is supported by slot 120 may be different in the forward facing configuration versus a rear facing configuration. In some cases, the angle that the mobile input device is supported may be designed so that a camera disposed in the mobile input device will have a suitable viewing angle for video conferencing (e.g., the camera is pointed toward a user's face) when inserted in one direction (e.g., forward facing), and a display of the mobile input device may have a better viewing angle for watching media when inserted to face the other direction (e.g., rear facing). Slot 120 can be configured to create a different angle for a mobile input device that is inserted in landscape mode versus portrait mode. This may be realized by configuring slot 120 to have a larger gap in a center portion that is wide enough to accommodate a portrait orientation to allow the mobile input device to recline farther back. Portions of slot 120 that are outside of the widened gap could support a landscape orientation in a steeper angle as there would be less room within the portions of the slot outside of the widened gap. In some implementations, the landscape orientation may be leaned back further than the portrait orientation (e.g., for watching movies or other media). The portrait orientation may be more upright as more touch screen interaction may be desired in this orientation.

In certain embodiments, the slot may be configured to provide four different angles for a mobile input device in the same orientation (i.e. landscape). These can include configurations in the forward/backward position on the first side, and the forward/backward position on the second side. When considering both landscape and portrait orientations, the total number of potential angles is 8 (forward/back landscape side one, forward/back landscape side 2, forward/back portrait side 1, forward/back portrait side 2). More angles are possible as some slots may have multiple dimensions or features (e.g., frictional features 150) within the slot to provide support for multiple angles. Some typical angles that can be possible with slot 120, in either the forward or backward configuration, are anywhere between 40-80 degrees relative to housing 110. With respect to viewing angles, one of ordinary skill in the art would understand the many variations, modifications, and alternative embodiments thereof.

In some embodiments, the inside surface of slot 120 may have frictional features (e.g., fins) 150, or other contours to help support and grip the portion of the mobile input device resting against it. Fins are described here and shown in FIGS. 1-3, however other frictional features can be used, such as any suitable protrusions, patterns (symmetric or asymmetric), coatings, or the like, as would be appreciated by one of ordinary skill in the art with the benefit of this disclosure. There may be one fin or many fins that may span any length of slot 120. Different mobile input devices can have different thicknesses and curvatures and may contact the frictional features at different places. Thus, frictional features 150 can help to secure mobile input devices of varying dimensions. Some slots may include an overmolded rubber or polyurethane (PU) compound or other coating to increase the coefficient of friction of the mobile input device and an inner surface of the slot. The exterior of slot 210 may be formed of a same material as an outer shell of an inner surface of slot 210.

As discussed above, the opening of slot 210 on a top side of housing 110 may be different than the opening of slot 210 on the bottom side of housing 110, according to certain embodiments. For instance, the slot may be wider on the top side (e.g., 9 mm) than on the bottom side (e.g., 7 mm), making many different viewing angles possible and accommodating many different types of mobile input devices having different dimensions (e.g., thicknesses, widths, etc.). In some implementations, the opening of slot 120 at the top of housing 110 may be offset from the opening of slot 120 on the bottom of housing 110. That is, a side view cutaway would reveal that the slot may be slanted one direction or another. In embodiments that utilize two or more of the variations discussed above, a user can "tune" angles to preference in either forward or rear facing portrait or landscape mode depending on where they situate the mobile input device along slot 120. For instance, configuring the mobile input device closer to one edge of slot 120 may result in a steeper viewing angle, and configuring the mobile input device closer to the opposite edge of slot 120 may result in a more shallow viewing angle.

In some embodiments, the left side of slot 210 may have different internal angles than the right side of slot 120, thus the placement of smaller profile mobile input devices (e.g., in portrait mode) may incline at different angles based on its relative position within slot 210 and the internal angles therein.

Slot 120 may be formed (e.g., length, width, contouring, etc.) to be more easily carried. As described above, some implementations may include a grip-like carrying portion of the slot that widens to accommodate a person's hand (e.g., see FIG. 7B). For example, the slot may widen in a pattern that conforms to a user's hand, like a handle. In some cases, there may be multiple slots for different purposes (e.g., holding a mobile input device in various upright positions, providing a handle for carrying, for hanging on a wall mount, etc.).

In some embodiments, an energy storage device, such as a battery pack, can be disposed within housing 110. For example, energy storage device 170 can be used to transfer energy (e.g., electrical power) to batteries stored within the mobile input device. Energy storage device 170 can be referred to as a battery pack, power pack, power source, or the like. The weight of energy storage device 170 can be sufficient to provide a strong base (e.g., center of gravity) to prevent tipping when a mobile input device is configured in slot 120. Energy storage device 170 can be disposed anywhere within housing 110. Energy storage device 170 may be robust enough to store enough energy to charge a mobile input device several times (e.g., 3 times) before having to be recharged. Any suitable amount of power storage can be implemented; preferably having dimensions that allow energy storage device 170 to be disposed within housing 110. In some embodiments, energy storage device 170 can be coupled to a mobile input device via socket 160. Socket 160 can be an electrical interface including a universal serial bus (USB), Firewire, or other suitable interface, as would be appreciated by one of ordinary skill in the art.

Pouch 130 may be used to store items such as cables, adaptors, or the like. Cable 140 is stored in pouch 130, as further shown in FIG. 2. Cable 140 can be used as a charging cable to connect a mobile input device (e.g., smart phone) to energy storage device 170 and/or to connect to a power supply (e.g., wall-mounted power supply unit). Cable 140 can be retractable. In some embodiments, energy storage device 170 can charge a mobile input device by way of inductive charging (e.g., via an inductive coil), as would be appreciated by one of ordinary skill in the art.

Figure 2:
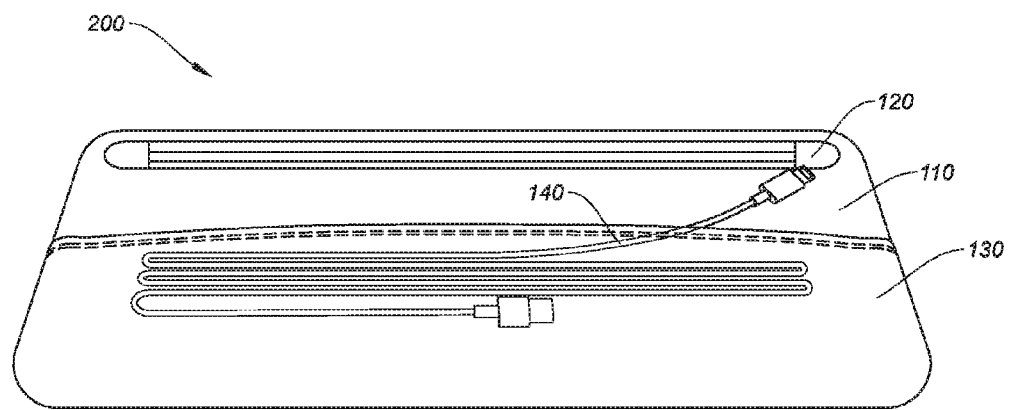
FIG. 2 shows a charging apparatus for a mobile input device having a charging cable, according to certain embodiments.

FIG. 2 shows charging apparatus 200 for a mobile input device having a charging cable 140, according to certain embodiments. Cable 140 can be stored in pouch 130 (shown as translucent). As discussed above, some embodiments may provide for both landscape and portrait orientation in a forward and reverse facing direction on either side of housing 110. That is, a mobile input device may be configurable in the same orientations when housing 110 is flipped on one side (shown) or the opposite side, since slot 120 passes through housing 110. Some embodiments may incorporate fins, coverings, coatings, etc. (e.g., frictional features), discussed above to help grip and secure mobile input device 270, thereby providing additional functionality with more viewing angles. Charging apparatus 200 is shown having similar features (e.g., same type of slot, housing, etc.) as charging apparatuses 100, 300, 400, and 700.

Figure 3:
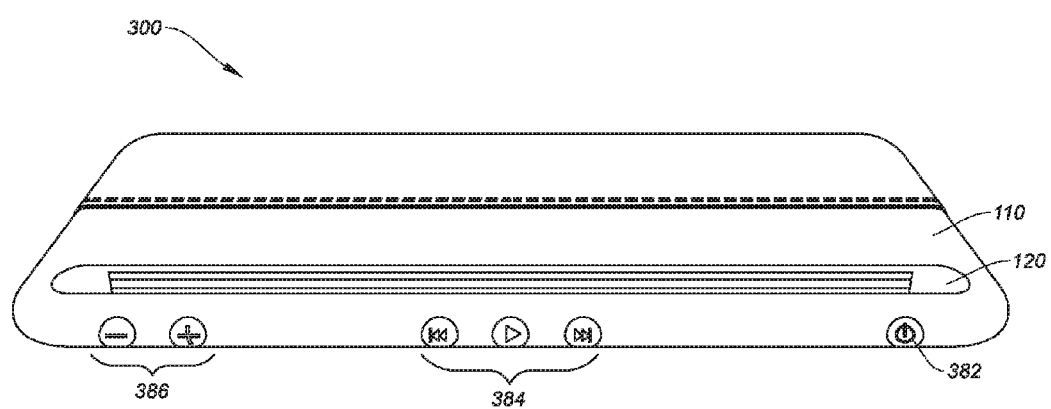
FIG. 3 shows a charging apparatus for a mobile input device having volume, media, and power controls, according to certain embodiments.

FIG. 3 shows charging apparatus 300 for a mobile input device having volume, media, and power controls, according to certain embodiments. Charging apparatus 300 includes housing 110, slot 120, and a number of controls (382, 384, 386) disposed on one end of housing 110. Power switch 382 can turn the charging apparatus 300 on or off. In some embodiments, power switch 382 may further include a standby option (e.g., press and hold). Media controls 384 includes buttons for play, next track and previous track functions. Other media controls may be included (e.g., pause, fast forward, rewind, etc.), etc. Volume controls 386 includes buttons to increase or decrease an audio volume. Controls 382-386 are shown on one particular implementation of a charging apparatus, although many alternative embodiments are possible with different combinations of features shown or not expressly shown in the figures (e.g., light-emitting diodes, touch screens, mini-displays, etc.). For instance, some embodiments may employ Bluetooth capabilities (and a button to turn it on or off) or other suitable communication protocol to provide communication (e.g., volume control) between charging apparatus 300 and the mobile input device. Other features may be integrated on housing 110 including a keyboard (e.g., solid-state keyboard), a trackpad, one or more speakers, a joystick, a gamepad, microphone, or other suitable feature. Any of the features described or implied herein can be disposed on the charging apparatus in any location. Charging apparatus 300 is shown having similar features (e.g., same type of slot, housing, etc.) as charging apparatuses 100, 200, 400, and 700.

Figure 4:
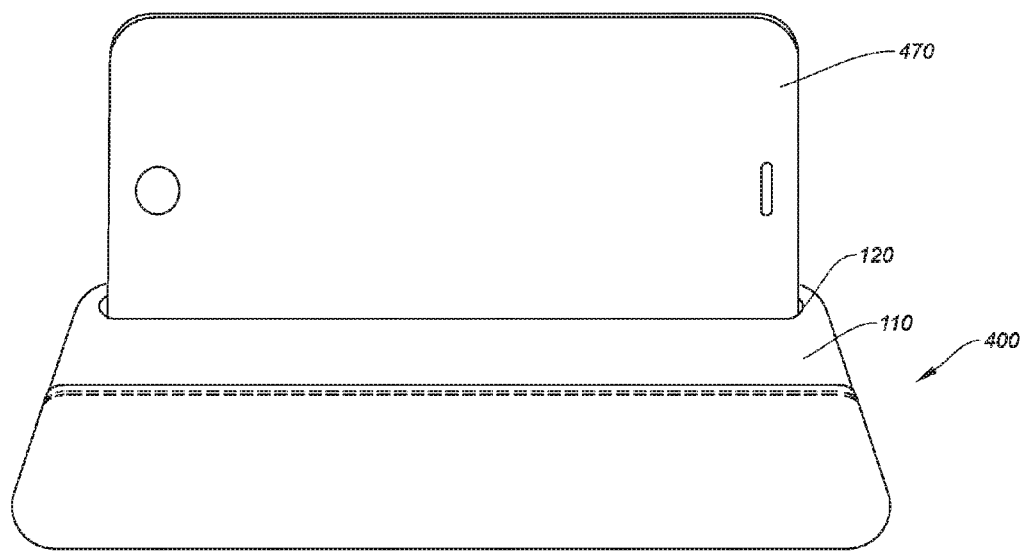
FIG. 4 shows a mobile input device (i.e., a smart phone) configured in a slot of a charging apparatus, according to certain embodiments.

FIG. 4 shows mobile input device 470 (i.e., a smart phone) configured in slot 120 of charging apparatus 400, according to certain embodiments. Mobile input device 470 is shown in a forward facing configuration and leaning back at an angle of approximately 70 degrees. In FIG. 4, mobile input device 470 is shown to be a smart phone. Charging apparatus 400 is shown having similar features (e.g., same type of slot, housing, etc.) as charging apparatuses 100, 200, 300, and 700.

FIG. 5 shows mobile input device 570 (i.e., a tablet computer) configured in slot 520 of charging apparatus 500, according to certain embodiments. Charging apparatus 500 may be of any suitable size. For instance, charging apparatus 500 is larger than charging apparatus 100 and can accommodate mobile input device 570. In some embodiments, slot 520 may include different features (e.g., over-molded compounds), dimensions (e.g., width, length), and combinations thereof (as discussed above with respect to FIG. 1) to accommodate tablet computers, smart phones, or other similarly shaped mobile input device. Mobile input device 570 is shown in a forward-facing configuration and leaning back at an angle of approximately 70 degrees relative to housing 510.

FIG. 6 shows mobile input device 570 (i.e., a tablet computer) configured in slot 520 of charging apparatus 600, according to certain embodiments. Mobile input device 570 is shown in a backward-facing configuration and leaning back at an angle of approximately 70 degrees relative to housing 510. Slot 520 can any suitable features and/or dimensions to support mobile input device 570 in a number of forward and backward-facing configurations, as discussed above with respect to FIG. 1. Charging apparatus 600 is shown having similar features and dimensions as charging apparatus 500.

Figure 7A:
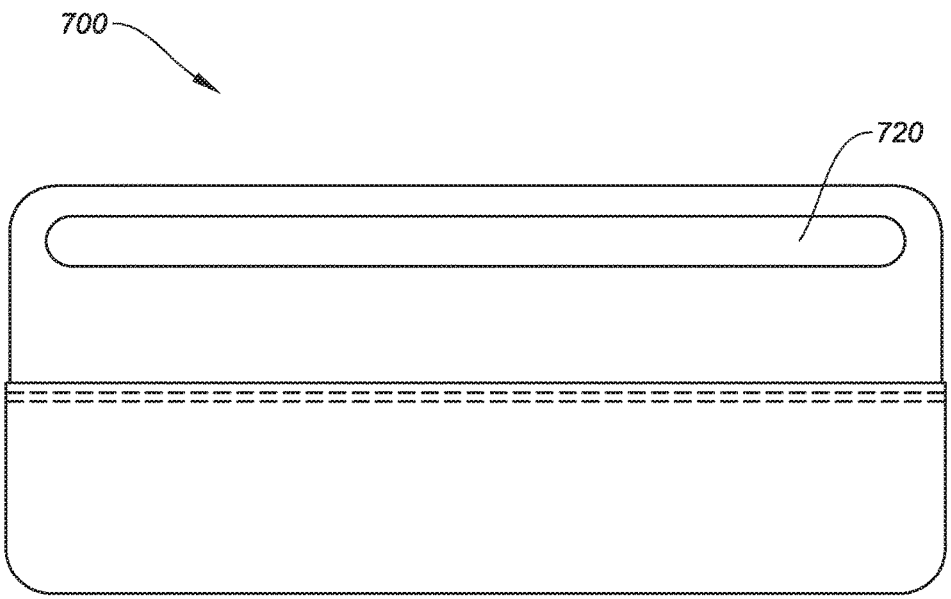
FIG. 7A shows a charging apparatus having a typical configuration for a slot, according to certain embodiments.
Figure 7B:
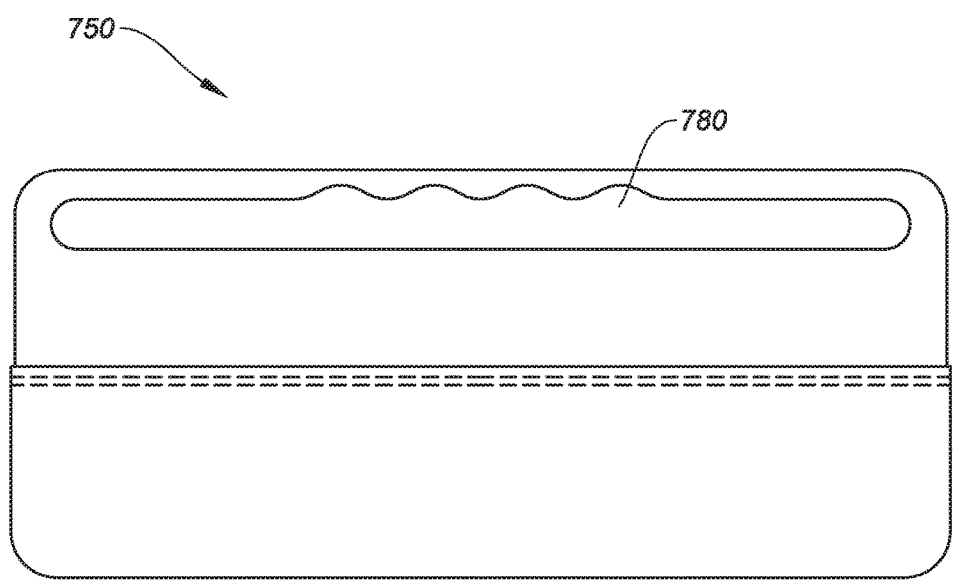
FIG. 7B shows a charging apparatus having a grip-shaped opening in a center of a slot, according to certain embodiments.

FIG. 7A shows charging apparatus 700 having a typical configuration for slot 720, according to certain embodiments. FIG. 7B shows charging apparatus 750 having a grip-shaped opening in a center of slot 780, according to certain embodiments, as further discussed above with respect to FIG. 1.

Figure 8:
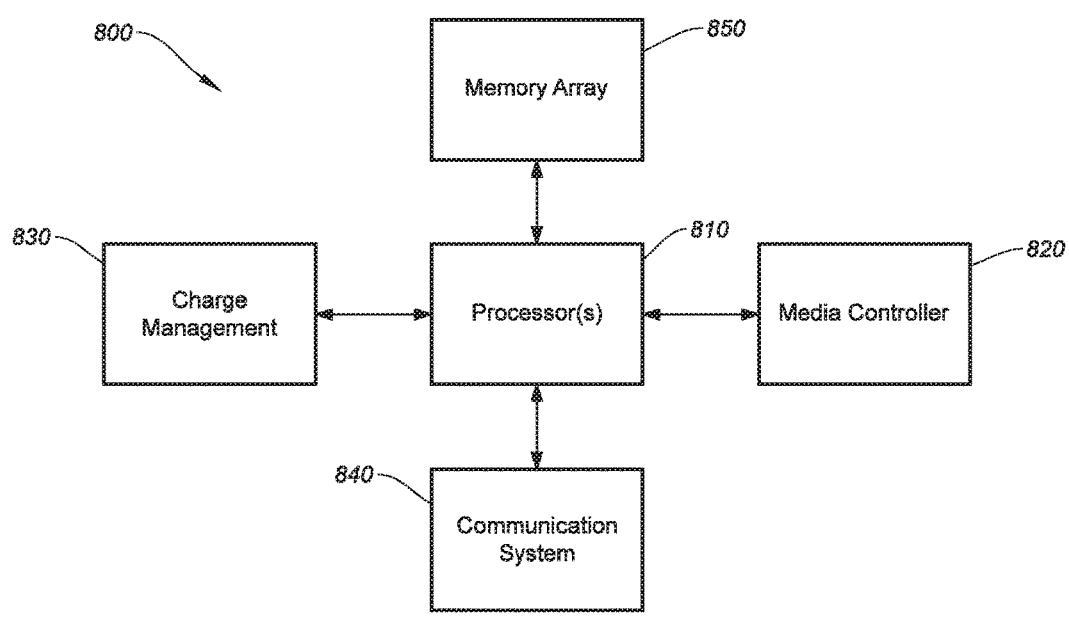
FIG. 8 is a simplified block diagram of system configured to operate a charging apparatus, according to certain embodiments.

FIG. 8 is a simplified block diagram of system 800 configured to operate a charging apparatus, according to certain embodiments. System 800 can include processor(s) 810, media controller 820, charge management system 830, communication system 840, and memory array 850. Each of system blocks 820-850 can be in electrical communication with processor(s) 810. System 800 may include more or fewer systems, as would be appreciated by one of ordinary skill in the art, and are not shown or discussed to prevent obfuscation of the novel features described herein. System blocks 820-850 may be implemented as separate modules, or alternatively, two or more system blocks may be combined in a single module. For instance, some or all of system blocks 820-850 may be subsumed by processor(s) 810. System 800 and variants thereof can be used to operate the charging apparatuses described and depicted (FIGS. 1-7B) throughout this disclosure.

In certain embodiments, processor(s) 810 may include one or more microprocessors (μCs) and may control the operation of system 800. Alternatively, processor(s) 810 may include one or more microcontrollers (MCUs), digital signal processors (DSPs), or the like, with supporting hardware and/or firmware (e.g., memory, programmable I/Os, etc.), as would be appreciated by one of ordinary skill in the art. In some embodiments, processor(s) 810 may be configured to control aspects of charging controls, media controls, and the like.

Media controller 820 may be configured to control the media controls shown in FIG. 3, according to certain embodiments. Alternatively or additionally, media controls may be controlled wholly or in part by processor(s) 810. Some non-limiting examples of possible media controls include volume control, transport controls (e.g., play, rewind, fast-forward, stop, pause), power on/off, charging on/off, communication (e.g., Bluetooth) on/off, or the like.

Memory array 850 can store information such as charging profiles, media control parameters, communication parameters, or the like. Memory array 850 may store one or more software programs to be executed by processors (e.g., processor(s) 810). It should be understood that "software" can refer to sequences of instructions that, when executed by processor(s), cause system 800 to perform certain operations of software programs. The instructions can be stored as firmware residing in read-only memory (ROM) and/or applications stored in media storage that can be read into memory for processing by processing devices (processor(s) 810). Software can be implemented as a single program or a collection of separate programs and can be stored in non-volatile storage and copied in whole or in-part to volatile working memory during program execution. Memory array 850 can include random access memory (RAM), read-only memory (ROM), long term storage (e.g., hard drive, optical drive, etc.), and the like, as would be understood by one of ordinary skill in the art.

Charge management system 830 can be configured to manage power distribution between systems (blocks 810-850), charging operations, power efficiency, and the like, for charging apparatus 100. In some embodiments, charge management system 830 can include one or more batteries (e.g., electronic storage device 170), a recharging system for the battery (e.g., USB cable), power management devices (e.g., low-dropout voltage regulators—not shown), or the like. In certain embodiments, the functions provided by charge management system 830 may be incorporated into processor(s) 810. Energy storage device 170 can be any suitable rechargeable energy storage device including, but not limited to, NiMH, NiCd, lead-acid, lithium-ion, lithium-ion polymer, and the like. Energy storage device 170 may charge a mobile input device via a cable (e.g., USB cable), or inductive power coupling. The recharging system (e.g., to recharge energy storage device 170) can include an additional cable (specific for the recharging purpose) or it can use the mobile input device's socket 160 (e.g., coupled to a computer, power adapter, etc.) to recharge energy storage device 170.

Communication system 840 can be configured to provide wireless communication between charging apparatus 100 and a mobile input device. Some non-limiting examples of communication between charging apparatus 100 and a mobile input device can include media control operations, charging operations, communicating status updates including battery charge capacity, state-of-charge, charging/discharging rate, etc. Communications system 840 can be configured to provide radio-frequency (RF), Bluetooth, infra-red, Zigbee, or other suitable communication protocol to communicate with other wireless devices. System 800 may optionally comprise a hardwired connection to mobile input device 470. For example, energy storage device 170 can be configured to receive a Universal Serial Bus (USB) cable to enable bi-directional electronic communication with mobile input device 470 or other external devices via socket 160. Some embodiments may utilize different types of cables or connection protocol standards to establish hardwired communication with other entities.

Although certain necessary systems may not expressly discussed, they should be considered as part of system 800, as would be understood by one of ordinary skill in the art. For example, system 800 may include a bus system to transfer power and/or data to and from the different systems therein.

It should be appreciated that system 800 is illustrative and that variations and modifications are possible. System 800 can have other capabilities not specifically described herein. Further, while system 800 is described with reference to particular blocks (810-850), it is to be understood that these blocks are defined for convenience of description and are not intended to imply a particular physical arrangement of component parts. Further, the blocks need not correspond to physically distinct components. Blocks can be configured to perform various operations, e.g., by programming a processor or providing appropriate control circuitry, and various blocks may or may not be reconfigurable depending on how the initial configuration is obtained.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. The phrase "based on" should be understood to be open-ended, and not limiting in any way, and is intended to be interpreted or otherwise read as "based at least in part on," where appropriate. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

What is claimed is:

1. A charging apparatus comprising:
   a housing having a substantially rectangular shape and including:
      a top side;
      a bottom side; and
      a slot that passes through from the top side to the bottom side of the housing such that the slot is operable to receive a mobile input device from both the top side or from the bottom side of the housing and secure the mobile input device in an upright configuration; and
   an energy storage device disposed within the housing to electrically couple to and charge the mobile input device.

2. The apparatus of claim 1 further comprising an inductive device to inductively transfer energy from the energy storage device to the mobile input device.

3. The apparatus of claim 1 further comprising a cable to couple to and transfer energy from the energy storage device to the mobile input device.

4. The apparatus of claim 3 wherein the cable is retractable.

5. The apparatus of claim 1 wherein the slot includes inner walls having a surface area, wherein the surface area of the inner walls includes a covering to increase a coefficient of friction between the mobile input device and the surface area of the slot when the mobile input device is secured in the slot in the upright configuration.

6. The apparatus of claim 5 wherein the covering includes a rubber or polyurethane (PU) coating.

7. The apparatus of claim 1 wherein the rectangular-shaped housing includes long edges and short edges, and wherein the slot extends along one of the long edges of the housing.

8. The apparatus of claim 1 wherein the slot supports the mobile input device in an upright portrait or landscape orientation.

9. The apparatus of claim 1 wherein the slot supports the mobile input device in both a forward facing or rear facing upright configuration.

10. The apparatus of claim 1 wherein at least a portion of the slot widens to form a grip-like opening to conform to a human hand.

11. A portable charging device comprising:
    a housing that includes:
       a top side; and
       a bottom side;
    a slot disposed in and passing through the housing, the slot operable to support a mobile input device in an upright configuration, wherein the slot is operable to receive the mobile input device from both the top side or the bottom side of the housing; and
    an energy storage device disposed in the housing to couple to and charge the mobile input device.

12. The portable charging device of claim 11 wherein the slot is over-molded with a rubber or polyurethane (PU) coating to increase a coefficient of friction between the slot and the mobile input device when the mobile input device is placed in the slot.

13. The portable charging device of claim 11 wherein the slot includes a widened region forming a grip-like opening to conform to a human hand.

14. The portable charging device of claim 11 wherein the mobile input device is a tablet computer.

15. The portable charging device of claim 11 wherein the slot supports the mobile input device in both a forward facing or rear facing upright configuration.

* * * * *